United States Patent
Luo et al.

(10) Patent No.: US 10,690,784 B2
(45) Date of Patent: Jun. 23, 2020

(54) 14C TESTING BOTTLE, TESTING DEVICE AND METHOD, SAMPLING AND PREPARATION SYSTEM AND METHOD

(71) Applicant: Zhejiang University, Hangzhou, Zhejiang Province (CN)

(72) Inventors: Zhongyang Luo, Hangzhou (CN); Yuxing Tang, Hangzhou (CN); Chunjiang Yu, Hangzhou (CN); Mengxiang Fang, Hangzhou (CN); Qinhui Wang, Hangzhou (CN); Tao Wang, Hangzhou (CN)

(73) Assignee: ZHEJIANG UNIVERSITY, Hangzhou, Zhejiang Province (CN)

( * ) Notice: Subject to any disclaimer, the term of this patent is extended or adjusted under 35 U.S.C. 154(b) by 249 days.

(21) Appl. No.: 15/858,523

(22) Filed: Dec. 29, 2017

(65) Prior Publication Data
US 2019/0154848 A1 May 23, 2019

(30) Foreign Application Priority Data
Nov. 20, 2017 (CN) .......................... 2017 1 1154536

(51) Int. Cl.
*G01T 7/00* (2006.01)
*G01T 1/20* (2006.01)
(Continued)

(52) U.S. Cl.
CPC ........... *G01T 1/2002* (2013.01); *G01N 21/76* (2013.01); *G01T 1/204* (2013.01); *G01T 1/208* (2013.01); *G01T 7/02* (2013.01)

(58) Field of Classification Search
None
See application file for complete search history.

(56) References Cited

U.S. PATENT DOCUMENTS

| 4,019,864 A | 4/1977 | Saito et al. |
| 4,368,008 A | 1/1983 | Budzich |
| (Continued) | | |

FOREIGN PATENT DOCUMENTS

JP  2005291539 A  10/2005

OTHER PUBLICATIONS

Office Action dated Dec. 29, 2018 for corresponding U.S. Appl. No. 15/858,548, filed Dec. 29, 2017.
(Continued)

*Primary Examiner* — Paul S Hyun
(74) *Attorney, Agent, or Firm* — David D. Brush; Westman, Champlin & Koehler, P.A.

(57) ABSTRACT

A $^{14}C$ testing bottle, a $^{14}C$ testing device, a $^{14}C$ testing method, a sampling and preparation system and its implementation method are provided. The $^{14}C$ testing bottle includes a pressure-bearing shell and a sample bin positioned in the pressure-bearing shell. A cavity is arranged in the sample bin and the $^{14}C$ testing bottle is provided with an injection port connected to the cavity. The sample bin may diffuse the light produced in the cavity and at least part of the sample bin is transparent. An optical fiber channel is set on the pressure-bearing shell. One end of the optical fiber channel is connected with an external scintillation counter, and the other end of the optical fiber channel is connected with the transparent part of the sample bin. The $^{14}C$ testing bottle may measure the $^{14}C$ content in the carbon dioxide sample rapidly.

9 Claims, 9 Drawing Sheets

(51) Int. Cl.
*G01N 21/76* (2006.01)
*G01T 1/208* (2006.01)
*G01T 1/204* (2006.01)
*G01T 7/02* (2006.01)

(56) References Cited

U.S. PATENT DOCUMENTS

| | | |
|---|---|---|
| 5,279,970 A | 1/1994 | Patashnick et al. |
| 2012/0312994 A1* | 12/2012 | Nikitin .................. G01T 1/2002 250/362 |

OTHER PUBLICATIONS

Office Action dated Jun. 19, 2018 for corresponding U.S. Appl. No. 15/858,548, filed Dec. 29, 2017.

* cited by examiner

14C TESTING BOTTLE, TESTING DEVICE AND METHOD, SAMPLING AND PREPARATION SYSTEM AND METHOD

CROSS-REFERENCE TO RELATED APPLICATIONS

The present application is based on, and claims priority from, Chinese Patent Application No. 201711154536.9, filed on Nov. 20, 2017, entitled "$^{14}C$ testing bottle, testing device and method, sampling and preparation system and method", the disclosure of which is hereby incorporated by reference herein in its entirety.

TECHNICAL FIELD

The present invention involves the field of isotope detection, in which the $^{14}C$ testing bottle, $^{14}C$ testing device and its testing method, sampling and preparation system and its implementation method are disclosed.

BACKGROUND ART

At present, coal is still the main fuel in the power industry. With the social development and economic improvement, there is a sharp increase of demand of electric power, and a sharp decrease of coal storage, and also huge damage to our environment.

However, biomass is a renewable energy containing carbon. It is the characteristics of carbon neutral make biomass energy be applied for replacing part of fossil energy represented by coal, and reducing emission of carbon dioxide to mitigate greenhouse effect. Biomass and coal co-fired has been confirmed as an excellent method for biomass energy large-scale utilization by existing technology. It is an efficient and environmental method for producing energy, which can not only decrease the emission of pollution and carbon dioxide, but also utilize the biomass fuel with low heat value efficiently.

However, lacking of effective and reliable detection technology and device of biomass blending rate make it unable that the government formulate standards and policies for coal and biomass co-fired power generation subsidies, which limits the development of co-fired power generation technology and its market development in China.

Radiocarbon($^{14}C$) is a radioactive isotope of carbon, which was first discovered by Martin Kamen and Sam Ruben at the Radiation Laboratory of UC Berkeley in Feb. 27, 1940.

The cosmic rays hitting nitrogen atoms in the atmosphere make the $^{14}C$ production. The living creatures' $^{14}C$ radioactivity is consistent with the atmosphere level, because of the atmosphere carbon cycle. However, the coal's $^{14}C$ radioactivity decays mostly, because of being buried deep in the ground for millions of years. So, the power station burn the biomass or not, and how much their burned, in other words, how is the blending ratio could be known by sampling the flue gas in the boiler flue of coal and biomass co-fired power station and measuring the $^{14}C$ in the carbon dioxide.

The technique based on the radiometric dating of $^{14}C$ isotopes was first applied for research of archaeology and geology, which is an effective method for biological component identification at present. Differ from the situation of garbage incineration power station, the supply of bio fuel is affected by season, which make the biomass blending rate is no more than 5% in the coal and biomass co-fired power station. While the biomass blending rate is low, accelerator mass spectrometry (AMS) is the most accurate detection method for $^{14}C$ radioactivity, but the equipment is too expensive to be popularized.

In the prior art, there are also some methods to measure the $^{14}C$ in the carbon dioxide by using scintillation counter. For example, the prior art attempts to obtain carbon dioxide by calcium carbonate suspensions or other absorbents, then count. However, under the condition of low blending ratio, the required detection accuracy can't be achieved.

When detected by liquid scintillation counters, enough carbon contents in sample of unit volume are required to reach certain accuracy, which only could be satisfied by benzene synthesis formerly. However, the process of benzene synthesis from carbon dioxide is very complex, and the problems of low conversion rate and long sampling preparation time exist.

SUMMARY OF THE INVENTION

The exemplary embodiments of the present invention provide a $^{14}C$ testing bottle, a $^{14}C$ testing method, a sampling and preparation system and method, for measuring the $^{14}C$ content in the carbon dioxide sample rapidly.

An exemplary embodiment of the present invention provides a $^{14}C$ testing bottle including a pressure-bearing shell and a sample bin positioned in the pressure-bearing shell, a cavity is arranged in the sample bin and the $^{14}C$ testing bottle is provided with an injection port connected to the cavity. Wherein, the sample bin diffuses the light produced in the cavity.

At least part of the sample bin is transparent, an optical fiber channels is set on the pressure-bearing shell, one end of the optical fiber channel is connected with an external scintillation counter, and the other end of the optical fiber channel is connected with the transparent part of the sample bin.

An exemplary embodiment of the present invention provides a $^{14}C$ testing device, including an optical fiber, a scintillation counter and the $^{14}C$ testing bottle. An exemplary embodiment of the present invention provides a $^{14}C$ testing method, which including the following steps:

Mixing step: mixing up liquid carbon dioxide or supercritical carbon dioxide and scintillator in the $^{14}C$ testing bottle, then set it in dark condition for a preset standing time.

Counting step: inserting one end of the optical fiber into the optical fiber channel of the $^{14}C$ testing bottle, connecting other end of the optical fiber to the scintillation counter, and then start counting.

wherein, the one end of the optical fiber is inserted into the optical fiber channel, and the other end of the optical fiber is connected to the scintillation counter.

By setting a pressure-bearing shell outside the sample bin, the carbon dioxide in the cavity of the sample bin can be kept in a relatively stable phase state, so that the carbon dioxide can be fully mixed with the scintillator. By setting the cavity which can generate diffuse reflection, the high-energy electrons decay from the $^{14}C$ in the carbon dioxide can collide with scintillator monomer, so that the scintillator monomer is in the excited state. When the scintillator monomer is de-excitation, a photon with a wavelength of about 380 nm will be generated. These photons can enter the external scintillation counter through the optical fiber channels, so that the $^{14}C$ in the carbon dioxide sample can be measured. The $^{14}C$ testing bottle has the advantages of simple structure, low cost, accurate test and short time needed. The $^{14}C$ testing method in the exemplary embodiments of the present invention, mixing liquid or supercritical carbon dioxide with scintillator directly and standing it, compared with converting carbon dioxide into benzene, makes the chemical reactions of carbon dioxide unnecessary, takes shorter testing time and measures more accurately.

Preferably, the transparent part of the sample bin is coated with a diffuse reflection coating on its outer surface.

In order to allow the photons to enter the optical fiber channels, reserving transparent part on the sample bin is necessary. However, in order to allow most or all photons to enter the optical fiber channel, the diffuse reflection capacity of cavity wall is necessary. Therefore, it is possible to make the sample bin transparent and coat the transparent outer wall with a diffuse reflection coating, making it have enough diffuse reflection capacity.

The fully transparent sample bin has the advantages of simple process and low cost.

Preferably, the sample bin comprises a body and a transparent sheet embedded in the body. The body has the inner wall which diffuses the light generated in the body. When the body of the sample bin does not need to be made transparent, the materials for the sample bin can be more abundant, for example, the metal with strong compressive capacity, the ceramic with stronger reflection ability, the polymer material easy to manufacture and low-cost, etc. Furthermore, the body and the pressure-bearing shell can be integral forming to reduce the process steps and equipment complexity.

Preferably, an insulation layer is arranged between the pressure-bearing shell and the sample bin. By setting the insulation layer, the storage time of carbon dioxide in the sample bin may be prolonged.

Preferably, the injection port is sealed by screwing a sealing cover to enhance the sealing effect.

Preferably, the $^{14}C$ testing bottle also comprises an air hole which connects through the pressure-bearing shell and the sample bin. The air hole is sealed by a screw or a rubber plug. By setting the air hole, the uneven internal and external pressure might be prevented when the carbon dioxide is injected.

Preferably, the sensor is arranged in the cavity, and the wire rod of the sensor is connected to the external terminal through the air hole. With the aid of the sensors, the pressure and temperature in the cavity can be adjusted better, and then the phase state of the carbon dioxide might be conveniently adjusted.

Preferably, the cavity is spherical or cylindrical. The spherical or cylindrical cavity has better pressure-bearing capacity.

Preferably, the following steps are further included before the mixing step:

Pretreatment step: pretreating the carbon dioxide into liquid or supercritical state.

wherein, if the carbon dioxide is pretreated into liquid state, the mixing ratio of the liquid carbon dioxide and the scintillator is from 10:1 to 100:1 (volume ratio) during the mixing step.

If the carbon dioxide is pretreated into supercritical state, the mixing ratio of the supercritical carbon dioxide and the scintillator is from 0.16 L/g to 0.4 L/g(volume mass ratio).

The above mixing ratio ensures the stability and homogeneity of the mixed liquor to be tested, ensures the relatively high luminous efficiency of scintillators, and then improves the accuracy of the measurement.

Further, preferably, the standing time is 2 to 5 hours. Standing the sample in the dark for the preset time may eliminate the effect of chemiluminescence in the mixture. And the preset time is not too long to induce the consumption of $^{14}C$.

Based on the above scheme, a kind of sampling and preparation method used for measuring the blending ratio of a coal and biomass co-fired power station is provided, which includes the following steps:

Particulate matter filtering step: filtering the particulate matter and water in the flue gas, and fixing the carbon dioxide of the pure flue gas in a carbon dioxide trap.

Flue gas measuring step: obtaining the amount of the pure flue gas entering the carbon dioxide trap by the mass flow controller.

Transferring step: transferring the carbon dioxide from the carbon dioxide trap into the $^{14}C$ testing device.

$^{14}C$ testing step: measuring the $^{14}C$ in the carbon dioxide trap by using the aforementioned $^{14}C$ testing method.

Blending ratio calculating step: calculating the blending ratio of the coal and biomass co-fired power station by using the obtained measurement of $^{14}C$ and the flue gas amount.

A sampling and preparation system used for measuring the blending ratio of a coal and biomass co-fired power station is also provided, which includes:

A sampling pipe is connected with a boiler flue of a co-fired power station, and the sampling pipe from the end close to the boiler flue to the end away from the boiler flue is sequentially arranged as:

a filtering device, a mass flow controller, a carbon dioxide trap and a pumping device.

The sampling and preparation system further includes a carbon dioxide transferring device and the aforementioned $^{14}C$ testing device. The carbon dioxide transferring device is used for transferring the carbon dioxide from the carbon dioxide traps into the $^{14}C$ testing device, and the $^{14}C$ testing device is used for measuring the $^{14}C$ in the carbon dioxide.

Compared to the prior art, the $^{14}C$ testing device in the exemplary embodiments of the present invention realizes the measurement of biomass blending ratio in the coal and biomass co-fired power station, and has the advantages of accurate measurement results, low cost and short testing time.

Further, preferably, the filtering device comprises the following sequentially connected units: A preposition dust filter, a dryer, and a postposition dust filter.

A cold trap is positioned between the mass flow controller and the carbon dioxide trap, and the temperature of the cold trap ranges from minus 40 degrees Celsius to minus 60 degrees Celsius.

Compared to the prior art, the present invention improves the purity of carbon dioxide by using a cold trap to purify and fix carbon dioxide, and then increases the detection accuracy. Liquid scintillation counter is used in the present invention to reduce the cost of the instrument automation. The competition of the liquid scintillation counter in the application of biomass bending ratio detection is developed.

1 $^{14}C$ testing device; 11 $^{14}C$ testing bottle; 111 pressure-bearing shell; 112 sample bin; 1121 body of sample bin; 1122 transparent sheet; 1123 seal ring; 113 cavity; 114 optical fiber channel; 115 insulation layer; 116 air hole; 117 sensor; 118 wire rod; 119 cover; 12 optical fiber; 13 scintillation counter;

2 filtering device; 21 preposition dust filter; 22 dryer; 23 postposition dust filter;

3 mass flow controller;

4 carbon dioxide trap;

5 pumping device;

6 boiler flue;

7 sampling pipe;

8 carbon dioxide transferring device; 81 heating device; 82 pressuring pump; 83 pressure pipeline; 84 pressure vessel; 85 gas compressor; 86 supercritical vessel; 87 valve;

9 cold trap.

DETAILED DESCRIPTION OF THE ILLUSTRATIVE EMBODIMENT

First Embodiment

Figure 1:
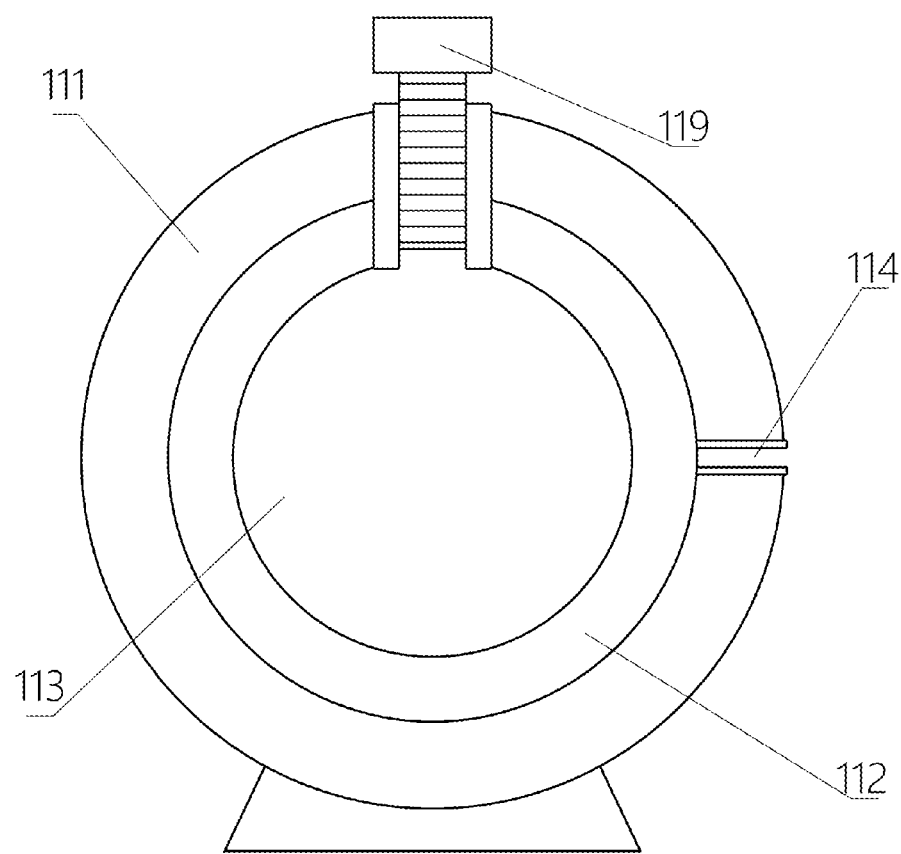
FIG. 1 is a profile schematic diagram of the $^{14}C$ testing bottle according to the first embodiment.

The first Embodiment provides a $^{14}C$ testing bottle 11, as shown in FIG. 1:

There is a pressure-bearing shell 111 and a sample bin 112 positioned in the pressure-bearing shell 111. A cavity 113 which was connected with the injection port on the $^{14}C$ testing bottle 11 is positioned in the sample bin 112.

The sample bin 112 diffuses the light produced in the cavity 113.

At least, part of the sample bin 112 is transparent. There are an optical fiber channel 114 set on the pressure-bearing shell 111 which connect the scintillation counter 13 at one end, and the other end of the optical fiber channel 114 is connected with the transparent part of the sample bin 112.

In the present embodiment, the sample bin 112 may be most or all transparent, and the outer surface of the transparent part of the sample bin 112 is coated with a diffuse reflection coating.

In order to allow the photons to enter the optical fiber channels 114, reserving transparent part on the sample bin 112 is necessary. However, in order to allow most or all photons to enter the optical fiber channels 114, the diffuse reflection capacity of cavity 113 wall is necessary. Therefore, it is possible to make the sample bin 112 transparent and coat the transparent outer wall with a diffuse reflection coating, making it have enough diffuse reflection capacity. Specifically, the polyethylene(PE) might be used, and might be made thin shell with uniform wall thickness. The fully transparent sample bin 112 has the advantages of simple process and low cost. The titanium pigment can be chose as the coating material.

In the present embodiment, the injection port is threadly sealed by screwing the cover 119. As the common knowledge, the thread sealing has relatively good air tightness and pressure resistance, which can improve the sealing effect. It is worth mentioning that the smaller the injection port, the better the insulation performance, the less influence to carbon dioxide from the external environment, so the use of conventional bolt shape cover 119 can also further improve the measurement accuracy. The threaded hole preset on the pressure-bearing shell 111 also may connect the pressure pipeline 83 conveniently.

Alternatively, the injection port of the $^{14}C$ testing bottle 11 may be connected directly with the carbon dioxide source through the pressure pipe 83 without the cover 119. The installation of the pipeline valve in the pressure pipe 83 may also separate the inner and outer environment of the cavity 113.

In the present embodiment, the cavity 113 is spherical or cylindrical. The spherical or cylindrical cavity 113 has better pressure-bearing capacity. The spherical cavity 113 can improve the uniformity of stress distribution in the cavity 113, be convenient for the arrangement of optical fiber 12, reduce the geometric blind area, and improve the counting efficiency of scintillation counter 13.

Figure 2:
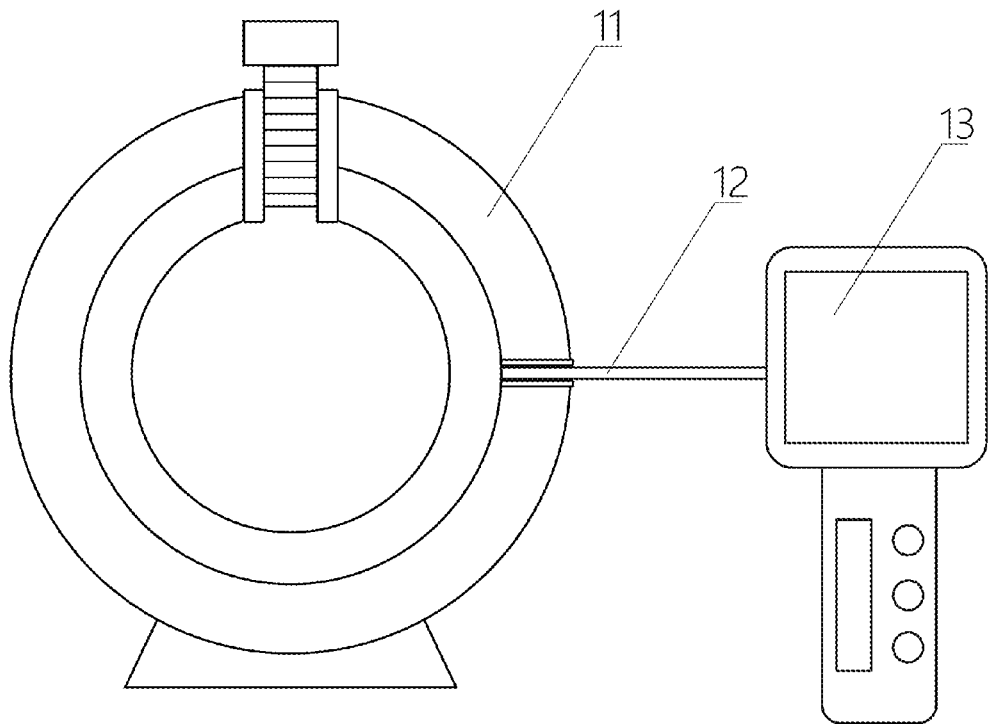
FIG. 2 is a schematic diagram of the $^{14}C$ testing device according to the first embodiment.

The first embodiment also provides a $^{14}C$ testing device 1, as shown in the FIG. 2, which includes the optical fiber 12, the scintillation counter 13, and the $^{14}C$ testing bottle 11. Specifically, one end of the optical fiber 12 is inserted into the optical fiber channel 114, and another end is connected to the scintillation counter 13.

Figure 3:
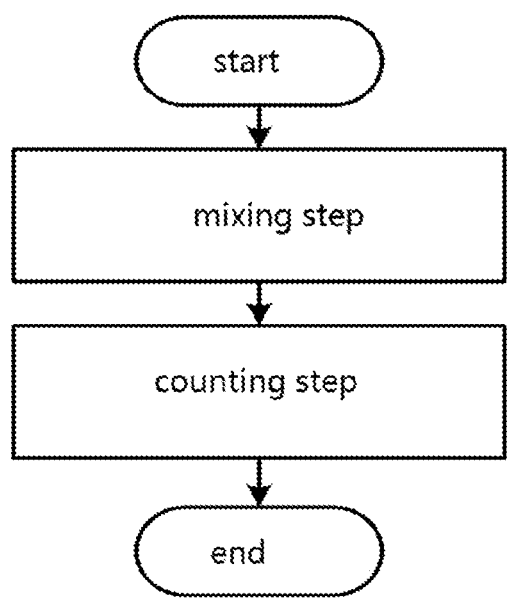
FIG. 3 is a flow chat of the $^{14}C$ testing method according to the first embodiment.

Based on the aforementioned $^{14}C$ testing bottle 11 and the $^{14}C$ testing device 1, the first embodiment provides a kind of $^{14}C$ testing method, as shown in FIG. 3, which includes the following steps:

Mixing step: Mixing up liquid or supercritical carbon dioxide and scintillator in the $^{14}C$ testing bottle 11, then setting it in dark condition for a preset standing time.

As an optimization, the scintillator may be liquid (scintillation liquid) or solid (scintillation crystal).

Further, as an optimization, when the carbon dioxide is liquid, certain PPO (2,5-two phenyl sulfamethoxazole) and POPOP (1,4-bis [2-(5-phenyl)]oxazolyl] benzene] may be dissolved in toluene solution as a scintillation agent, its specific formula may be PPO concentration of 30 g/L, POPOP concentration of 2 g/L toluene solution.

The standing time is 2 to 5 hours which may be increase or shorten according to the specific circumstances. Standing the sample in the dark for the preset time may eliminate the effect of chemiluminescence in the mixed liquor, and the preset time is not too long to induce the consumption of $^{14}C$.

Counting step: Inserting one end of the optical fiber 12 into the optical fiber channel 114 of the $^{14}C$ testing bottle 11, and the other end is connected to the scintillation counter 13, then start counting.

Specifically, during the mixing step, it is possible to pre-treat the carbon dioxide sample to liquid or supercritical state, or make the carbon dioxide the corresponding phase in the $^{14}C$ testing bottle 11 by controlling the environment temperature, in the process of injecting the carbon dioxide to $^{14}C$ testing bottle 11 through the pressure pipeline 83.

By setting a pressure-bearing shell 111 outside the sample bin 112, the carbon dioxide in the cavity 113 of the sample bin 112 can be kept in a relatively stable phase state, so that the carbon dioxide can be fully mixed with the scintillator. By setting the cavity 113 which can generate diffuse reflection, the high-energy electrons decay from the $^{14}C$ in the carbon dioxide may collide with scintillator monomer, so that the scintillator monomer is in the excited state. When the scintillator monomer is de-excitation, a photon with a wavelength of about 380 nm will be generated. These photons can enter the external scintillation counter 13 through the optical fiber channels 114, so that the $^{14}C$ in the carbon dioxide sample may be measured. The $^{14}C$ testing bottle 11 has the advantages of simple structure, low cost, accurate test and short time needed. The $^{14}C$ testing method of the present invention mix liquid or supercritical carbon dioxide with scintillator directly and stand it, compared with converting carbon dioxide into benzene, making chemical reactions of carbon dioxide is unnecessary, which takes shorter testing time and more accurate measurement.

Second Embodiment

Figure 4:
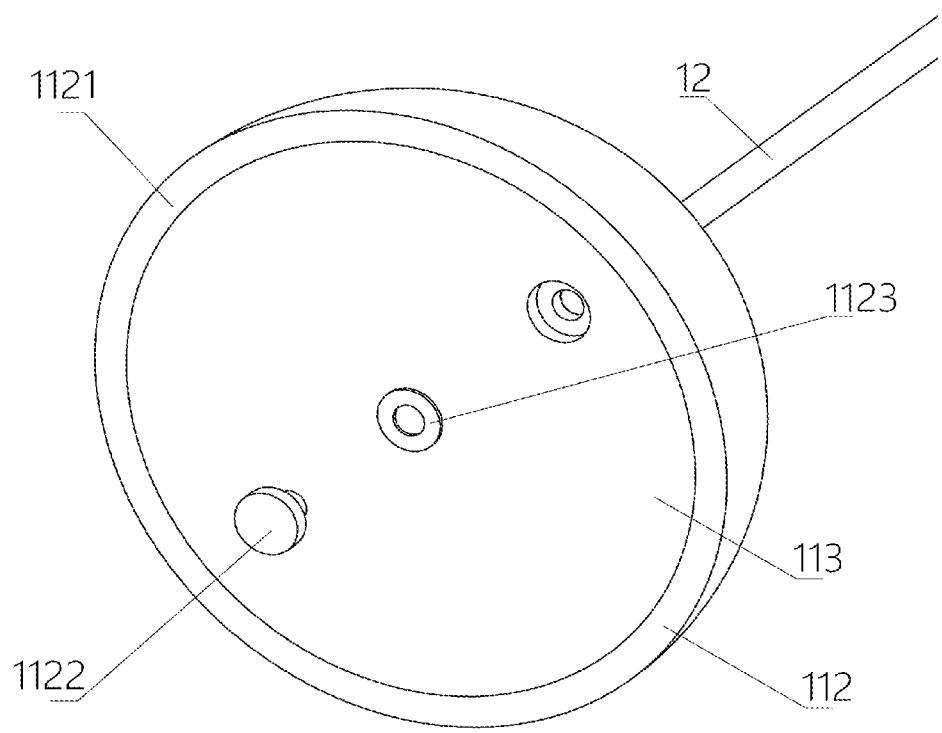
FIG. 4 is a 3D explosive schematic diagram of the joint between the optical fiber and the sample bin of the $^{14}C$ testing bottle according to the second embodiment.

The second embodiment provides $^{14}C$ testing bottle 11, which is different from the first embodiment. The main difference is that, in the first embodiment, the sample bin 112 is most or all transparent, but in the second embodiment, as shown in FIG. 4, the sample bin 122 comprises the body 1121 and the transparent sheets 1122 embedded in the body 1121.

The body 1121 has the inner wall which can diffuse the light generated in the body 1121. When the body 1121 of the sample bin 112 does not need to be made transparent, the materials for the sample bin 112 may be more abundant, for example, the metal with strong compressive capacity, the ceramic with stronger reflection ability, the polymer material easy to manufacture and low-cost, etc. Furthermore, the body 1121 and the pressure-bearing shell 111 may be integral forming to reduce the process steps and equipment complexity.

As a typical optimization of the present embodiment, it is possible to make ladder-like hatches on the body 1121, and the corresponding transparent sheets 1122 are integral formed with the hatches. Thus, the transparent sheets 1122 can be pressed on the body 1121 to form a better seal by using the pressure in the cavity 113. Further, the sealing effect can be improved by setting seal ring 1123 in the between the transparent sheets 1122 and body 1121.

Third Embodiment

Figure 5:
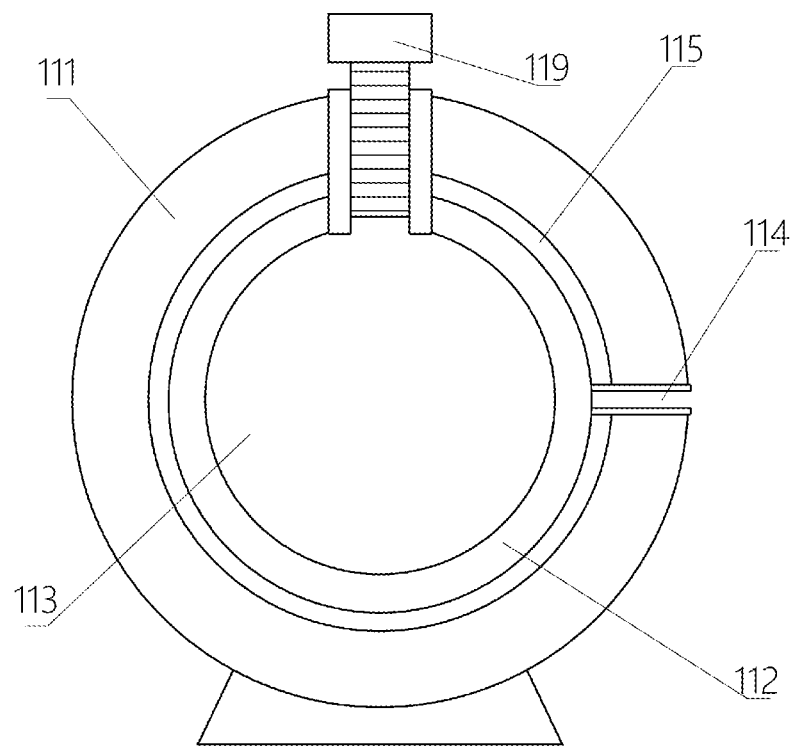
FIG. 5 is a profile schematic diagram of the $^{14}C$ testing bottle according to the third embodiment.

The third embodiment provides a $^{14}C$ testing bottle 11, which improves the first or the second embodiment. The main improvement is that, in the third embodiment, as shown in the FIG. 5, the insulation layer 115 is positioned between the pressure-bearing shell 111 and the sample bin 112. By setting the insulation layer 115, the storage time of carbon dioxide in the sample bin 112 may be prolonged.

Specifically, the insulation layer 115 may be foam material, plush material and so on.

When the insulation layer 115 is not set, the pressure-bearing shell 111 may provide the insulation function. However, the required temperature of carbon dioxide is low in the cavity 113, so the cost can be decreased dramatically by setting the insulation layer 115 which may decrease the required thickness of the pressure-bearing shell 111. In addition, the insulation layer 115 may provide buffer for the sample bin 112 to prevent deformation.

As the common knowledge of this field, in the insulation layer 115, there should be holes corresponding to the optical fiber channel 114 to allow the pass of optical fiber 12.

Fourth Embodiment

Figure 6:
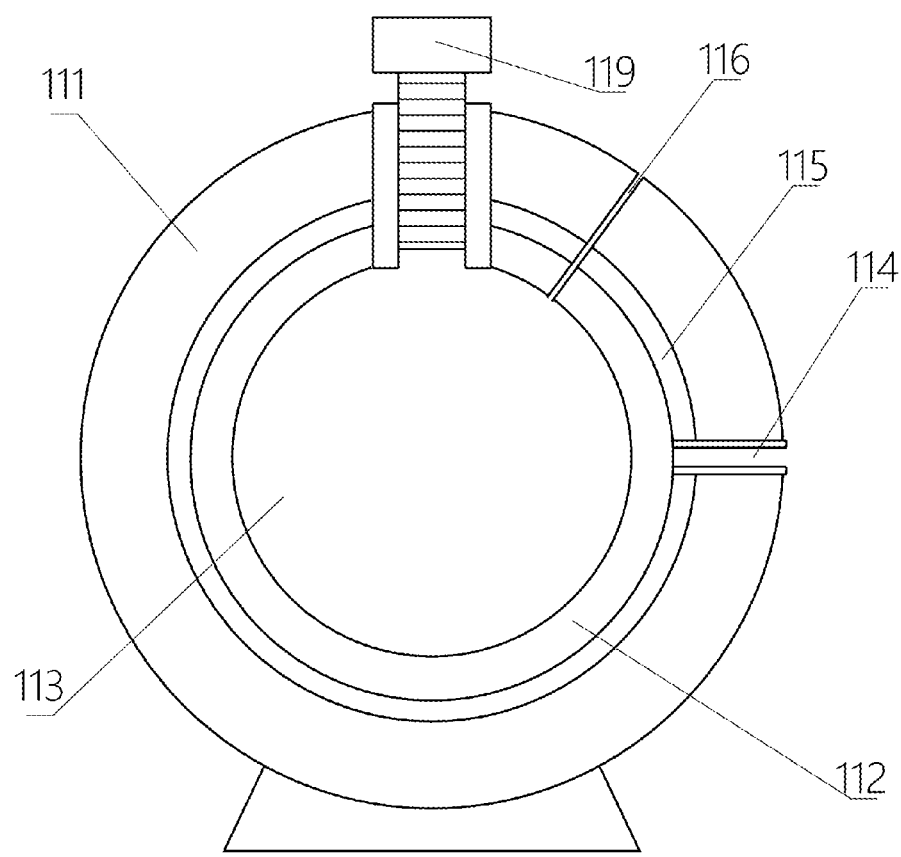
FIG. 6 is a profile schematic diagram of the $^{14}C$ testing bottle according to the fourth embodiment.

The fourth embodiment provides a $^{14}C$ testing bottle 11, which improves one of the first to the third embodiments. The main improvement is that, in the fourth embodiment, as shown in the FIG. 6, the $^{14}C$ testing bottle also 11 comprises the air holes 116 which connect through the pressure-bearing shell 111 and the sample bin 112, and air holes 116 are sealed by the screw or rubber plug.

By setting the air holes 116, the uneven internal and external pressure can be prevented when the carbon dioxide is injected.

Fifth Embodiment

Figure 7:
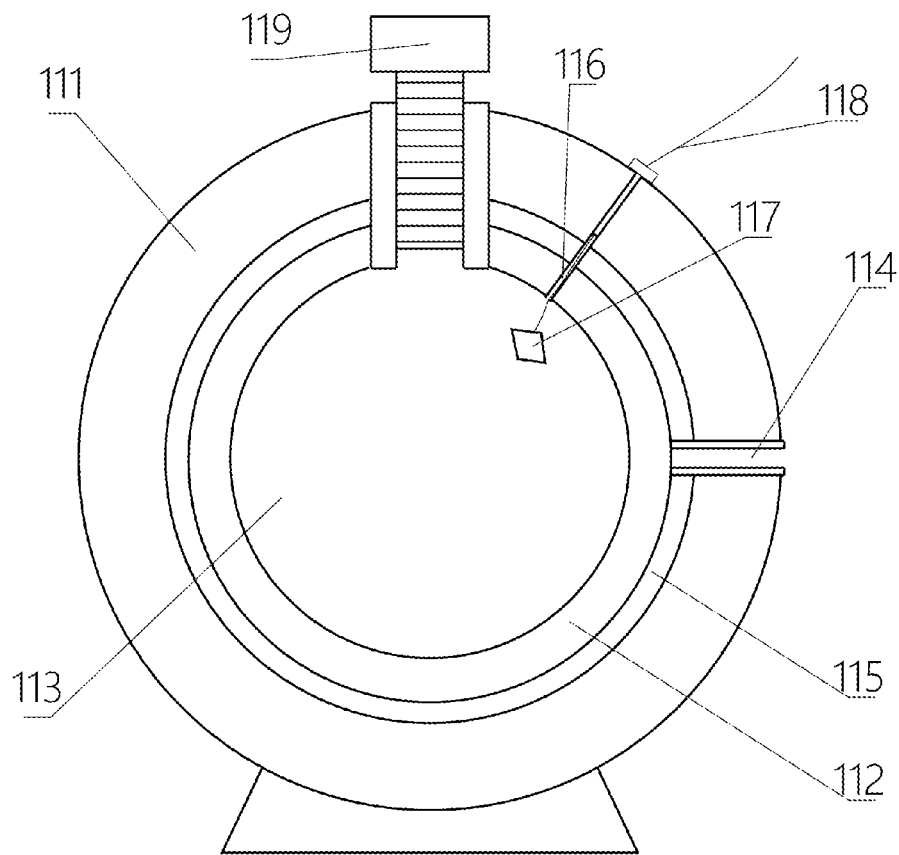
FIG. 7 is a profile schematic diagram of the $^{14}C$ testing bottle according to the fifth embodiment.

The fifth embodiment provides $^{14}C$ testing bottle 11, which further improves the fourth embodiment. The main improvement is that, in the fifth embodiment, as shown in FIG. 7, arranging the sensors 117 in the cavity 113.

With the aid of the sensors 117, the pressure in the cavity 113 may be adjusted more intuitively, and the phase state of the carbon dioxide may be conveniently adjusted.

In the present embodiment, it is possible to use wireless communication type sensors 117 which is placed into the cavity 113 for each use.

Further, the wire rod 118 of the sensors 117 may connect with the external terminal through the air holes 116. The wire rod 118 may include the power line and data connection line, which is fixed in the air holes 116 by the rubber seal or wax seal, or pass through the preset hole in the screw, connecting the outside. The preset hole in the screw also may use the rubber seal or wax seal to ensure the tightness.

When adjusting the tightness of the cavity 113, the screw may be unscrewed slowly according to the monitoring data of the sensor 117, and the screw is screwed again until the pressure drops to the required value.

Using wired connection may avoid the electromagnetic shielding to the wireless communication of sensors 117 produced by the pressure-bearing shell 111, and also can ensure the power supply of the sensors 117 better.

The sensors 117 referred to in the present embodiment may be temperature sensor, pressure sensor or other related sensing devices.

Sixth Embodiment

Figure 8:
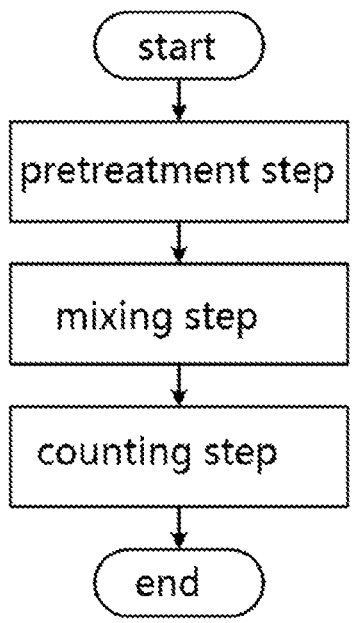
FIG. 8 is a flow chat of the $^{14}C$ testing method according to the sixth embodiment.

The sixth embodiment provides a $^{14}C$ testing method, which further improves one of the first to the fifth embodiments. The main improvement is that, in the sixth embodiment, as shown in FIG. 8, the following steps are included before the mixing step:

Pretreatment step: pre-treating the carbon dioxide into the liquid or supercritical state.

If the carbon dioxide is pretreated into liquid state, the mixing ratio of liquid carbon dioxide and scintillator is from 10:1 to 100:1 (volume ratio) during the mixing step.

If the carbon dioxide is pretreated into supercritical state, the mixing ratio of supercritical carbon dioxide and scintillator is from 0.16 L/g to 0.4 L/g(volume mass ratio).

If the scintillator is excessive, it may cause a decrease in the homogeneity and stability of the mixed liquor, thereby reducing the counting efficiency. However, if the scintillator is too little, it may make the dispersion density of the scintillator monomer in the mixed liquor is not high enough, and the produced photons will decrease because of less collision of the emitted beta electrons, thereby missing counting of the flashes, thus reducing the testing precision.

This mixing ratio may ensure the stability and homogeneity of the mixed liquor to be tested, and ensure the relatively high luminous efficiency of the scintillator, then improving the measurement accuracy.

In addition, when the carbon dioxide is in supercritical state, the 2-(4-Tert butyl phenyl)-5-(4-biphenyl)-1,3,4-oxdiazole(butyl-PBD) may be chosen as the scintillator.

Seventh Embodiment

As the common knowledge of this field, biomass and coal co-fired has been confirmed as an excellent method for biomass energy large-scale utilization by existing technology. It is an efficient and environmental method for producing power, which can not only decrease the emission of pollution and carbon dioxide, but also utilize the biomass fuel with low heat value efficiently.

However, lacking of effective and reliable detection technology and device of biomass blending rate make it unable that the government formulate standards and policies for coal and biomass co-fired power generation subsidies, which limits the development of co-fired power generation technology and market.

Figure 9:
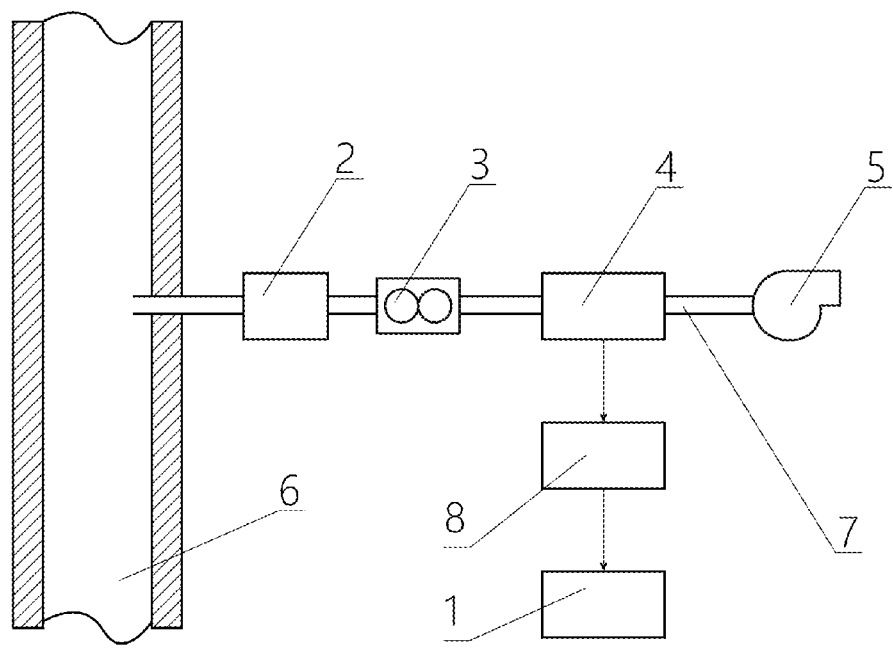
FIG. 9 is a structure schematic diagram of the sampling and preparation system according to the seventh embodiment.

Accordingly, the seventh embodiment provides a sampling and preparation system for measuring the biomass blending ratio in the coal and biomass co-fired power station, as shown in the FIG. 9, including:

The sampling pipe 7 connects with the boiler flue 6 of the co-fired power station, and the sampling pipe 7 from the end of sampling pipe 7 close to the boiler flue 6 to the end away from are arranged as:

the filtering device 2, the mass flow controller 3, the carbon dioxide trap 4 and the pumping device 5.

The sampling and preparation system also includes the carbon dioxide transferring device 8 and a $^{14}C$ testing device 1 described as above. The carbon dioxide transferring device 8 is used for transferring the carbon dioxide from the carbon dioxide trap 4 into the $^{14}C$ testing device 1, and the $^{14}C$ testing device 1 is used for measuring the $^{14}C$ in the carbon dioxide.

The arrow in the FIG. 9 presents the transferring direction of the carbon dioxide.

The carbon dioxide trap 4 mentioned in the present embodiment may be a cryogenic trap container, in particular, a cryogenic vessel with temperature less than or equal to −78.4 degrees centigrade.

Carbon dioxide condenses in the carbon dioxide trap 4 as solid state, then which can be transferred into the $^{14}C$ testing bottle 11 by heating, sublimation, etc. Obviously, when carbon dioxide is converted to liquid or supercritical state, it is easy to mix with the scintillator. In the present embodiment, the carbon dioxide can be directly loaded into the cavity 113 with stainless steel containers and then liquefied by adjusting the pressure and temperature in the cavity 113.

Figure 10:
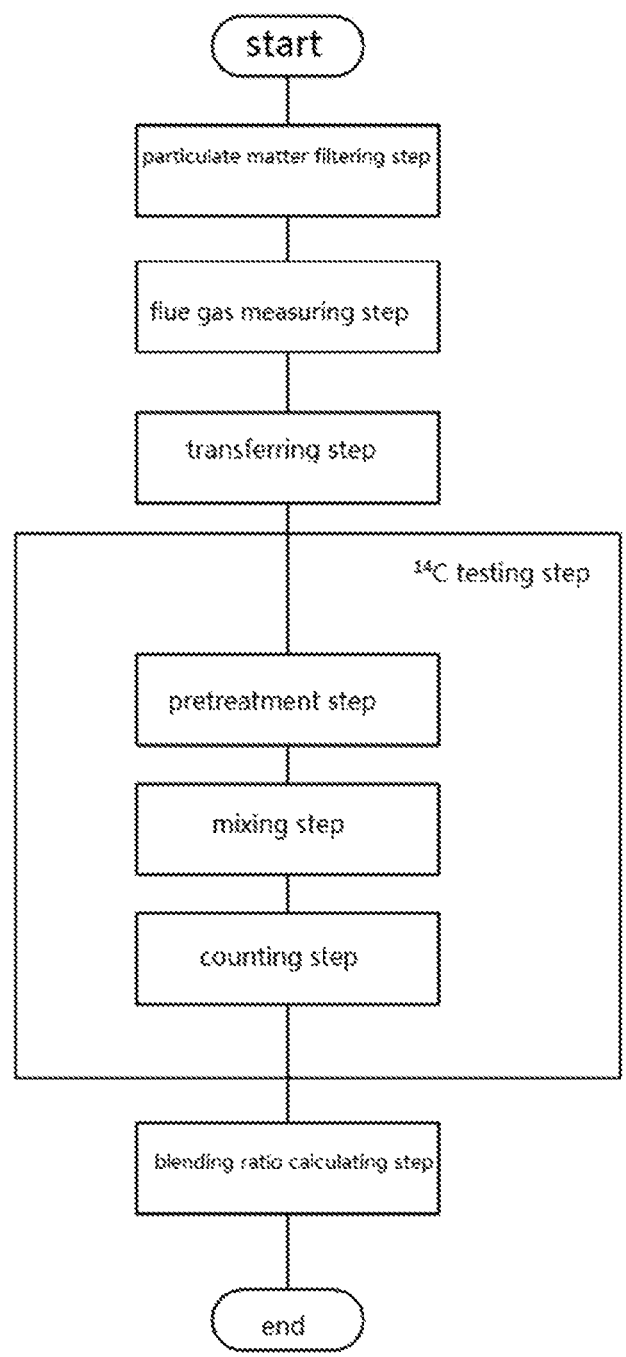
FIG. 10 is a flow chat of the sampling and preparation system according to the seventh embodiment.

Based on the aforementioned embodiment, as shown in the FIG. 10, the seventh embodiment provides a sampling and preparation method used for measuring the blending ratio of the coal and biomass co-fired power station, which includes the following steps:

Particulate matter filtering step: filtering the particulate matter and water in the flue gas by the filtering device 2, and fixing the carbon dioxide of the pure flue gas in the carbon dioxide trap 4.

Flue gas measuring step: obtaining the amount of the pure flue gas entering the carbon dioxide traps 4 by the mass flow controller 3.

Transferring step: transferring the carbon dioxide from the carbon dioxide traps 4 into the $^{14}C$ testing device.

$^{14}C$ testing step: Measuring the $^{14}C$ in the carbon dioxide traps 4 by using the $^{14}C$ testing method referred to any one embodiment ranged from the first to the sixth.

Blending ratio calculating step: Calculating the blending ratio of the coal and biomass co-fired power station by using the obtained measurement of $^{14}C$ and the flue gas amount.

Specifically, the biomass blending ratio can be calculated by the following formula.

$$c_{flue\ gas,B} = \frac{A_{sample}}{A_{ON}} \times 100\%$$

$$A_{ON} = \frac{0.95 A_{ox1N}}{\left(1 - 2 \cdot \frac{19-25}{1000}\right)} \times C_{anthro} \times 100\%$$

$$\text{Blending ratio}_{mass} = m_B / m_{Coal} = \frac{c_{flue\ gas,B}}{c_{C,B}} \bigg/ \frac{1 - c_{flue\ gas,B}}{c_{C,Coal}}$$

$$\text{Blending ratio}_{energy} = \frac{H_B}{H_{Coal}} = \frac{m_B \cdot Q_{Low,B}}{m_{Coal} \cdot Q_{Low,Coal}}$$

The meaning of each parameter in the above formula is as follows:

$c_{flue\ gas,B}$—The ratio of carbon dioxide produced by biomass combustion to total carbon dioxide in flue gas [Vol-%];

$A_{sample}$—Activity of $^{14}C$ in the sample under test [DPM/gC], the unit means the number of flashes measured per minute in carbon per gram;

$A_{ON}$—The general activity of $^{14}C$ in biomass today [DPM/gC];

$A_{ox1N}$—Activity of $^{14}C$ in the NBS SRM 4990b standard materials, [DPM/gC], its coefficient is 0.95 times because of "after 1950, a number of standards were developed, and we commonly use" absolute international standard activity (AISA)", which is defined as 95% of $^{14}C$ content in the NBS SRM 4990b standard material". The divisor is due to that, the $^{13}C$ value of oxalic acid in the AISA is −19‰, however the $^{13}C$ value of the biomass (wood) is generally considered to be −25‰, and there is a certain numerical relationship between the value of the $\delta^{14}C$ and the value of $\delta^{13}C$ in the material.";

The correction factor, for human activities which causes dramatic changes of $^{14}C$ concentration in atmospheric, for example:

Suess effect (diluting year by year) and nuclear test (inflating in short time);

Blending ratio$_{mass}$—Biomass blending ratio, mass basis[kg/kg];

Blending ratio$_{energy}$—Biomass blending ratio, energy basis [MJ/MJ];

$m_B$—Mass ratio of biomass in total fuel [kg/kg];

$m_{Coal}$—Mass ratio of coal in total fuel [kg/kg];

$c_{C,B}$—Mass content of carbon in biomass [kg/kg];

$c_{C,Coal}$—Mass content of carbon in coal[kg/kg];

$H_B$—Energy ratio of biomass in total energy supply [MJ/MJ];

$H_{Coal}$—Energy ratio of coal in total energy supply [MJ/MJ];

$Q_{Low,B}$—Low calorific value of biomass [kJ/kg];
$Q_{Low,Coal}$—Low calorific value of coal[kJ/kg].

The sampling and preparation system in the present embodiment realizes the measurement of biomass blending ratio in the coal and biomass co-fired power station, which has the advantages of accurate measurement results, low cost and short testing time. Liquid scintillation counter is used in the embodiment, and the cost of the instrument automation realizing may be reduced, which will improve the competition of the liquid scintillation counter in the application of biomass bending ratio detection.

Eighth Embodiment

Figure 11:
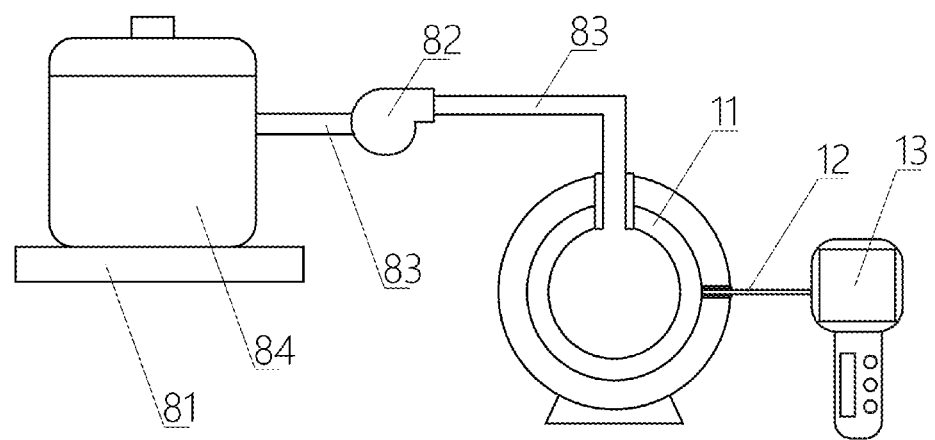
FIG. 11 is a schematic diagram of the carbon dioxide transferring device and the connected $^{14}C$ testing device according to the eighth embodiment.

The eighth embodiment provides a sampling and preparation system, which further improves the seventh embodiment. The main improvement is that, in the eighth embodiment, as shown in the FIG. 11, the carbon dioxide transferring devices 8 comprises the pressure vessel 84, the heating device 81, the pressuring pump 82 and the pressure pipeline 83.

Specifically, the heating device 81 is used to warm the pressure vessel 84. Two ends of the pressure pipeline 83 are connected with the hatch of the $^{14}C$ testing bottle 11 and the pressure vessel 84 respectively, and the pressuring pump 82 is set on the pressure pipeline 83.

According to the structure in the present embodiment, it provides a kind of improvement of the aforementioned sampling and preparation method in the seventh embodiment. Based on the seventh embodiment, during the transferring step, the solid carbon dioxide is transferred into the pressure vessel 84, by warming the pressure vessel 84 slowly, using the heating device 81, to convert carbon dioxide to gas phase. By using the pressuring pump 82, the carbon dioxide is pumped from the pressure vessel 84 into the cavity 113 of the $^{14}C$ testing bottle 11 through the pressure pipeline 83, and the carbon dioxide is converted to liquid phase, that is equivalent to the completion of the carbon dioxide pretreatment step in the transfer step.

In order to facilitate the mixing of carbon dioxide and scintillator, the scintillator may be preset in the cavity 113 and mixed by the oscillation.

It is worth mentioning that, the solid carbon dioxide may be transferred into the pressure vessel 84 through many ways in the existing technology, such as sublimation, crushing, and so on. This is not to be restated here.

Ninth Embodiment

The ninth embodiment provides a sampling and preparation system, which is different from the eighth embodiment. The main difference is that, in the eighth embodiment, the $^{14}C$ in the carbon dioxide is tested after converting the carbon dioxide to liquid phase, however, in the ninth embodiment, the carbon dioxide is tested after converting the carbon dioxide to supercritical phase.

The Supercritical fluid(SCF) is a state of matter. When the temperature and pressure of a matter is beyond the critical value, the properties of gas and liquid will be similar, and finally the fluid phenomenon of homogeneous phase will be reached. The supercritical fluid has not only the compressibility like gas, which may effuse like gas, but also the fluidity like liquid. Generally, the density of supercritical fluid is ranged from 0.1 to 1.0 g/ml.

Compared with pre-treating the carbon dioxide to liquid state, pre-treating the carbon dioxide to supercritical state has the advantage of forming the uniform and stable mixture with scintillator easily because of the excellent solubility of supercritical carbon dioxide.

Specifically, when the carbon dioxide is pretreated to supercritical state, it may be mixed with solid scintillator directly, and the adding of a certain amount of toluene PPO/POPOP scintillation solution is unnecessary to form the uniform and stable mixture.

Figure 12:
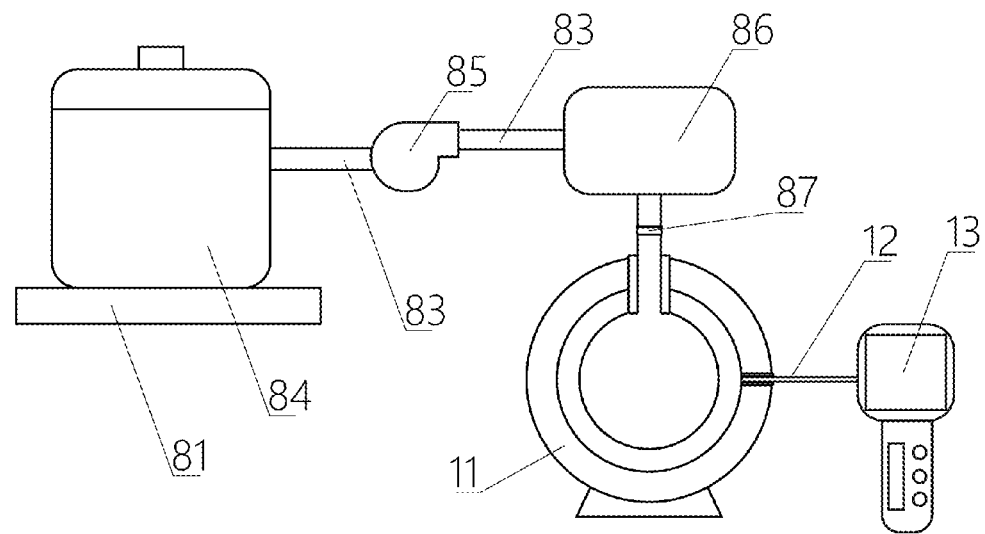
FIG. 12 is a schematic diagram of the carbon dioxide transferring device and the connected $^{14}C$ testing device according to the ninth embodiment.

Specifically, in the sampling and preparation system of the present embodiment, as shown in the FIG. 12, the carbon dioxide transferring device 8 comprises the pressure vessel 84, the heating device 81, the gas compressor 85, the pressure pipeline 83 and the supercritical vessel 86.

Specifically, the heating device 81 is used to warm the pressure vessel 84. Two ends of the pressure pipeline 83 are connected with the hatch of the $^{14}C$ testing bottle 11 and the pressure vessel 84 respectively, and the gas compressor 85 is set on the pressure pipeline 83. The supercritical vessel 86 is also set on the pressure pipeline 83 between the $^{14}C$ testing bottle 11 and the gas compressor 85.

It is possible to set the valve 87 between the supercritical vessel 86 and the $^{14}C$ testing bottle 11 to control the inflow of carbon dioxide.

According to the instruction of the present embodiment, it provides a sampling and preparation method differed from the eighth embodiment, which includes the following steps:

Based on the eighth embodiment, during the transferring process, the solid carbon dioxide is transferred into the pressure vessel 84, by warming the pressure vessel 84 slowly, using the heating device 81, to convert carbon dioxide to gas phase.

By using the gas compressor 85, the carbon dioxide is pumped from the pressure vessel 84 into the supercritical vessel 86 through the pressure pipeline 83. The carbon dioxide in the supercritical vessel 86 is converted to supercritical state, by controlling the temperature and pressure of the supercritical vessel 86.

Opening the valve 87, and the supercritical carbon dioxide is pumped into the $^{14}C$ testing bottle 11.

As a transformation of the present embodiment, it is possible to pump the carbon dioxide into the $^{14}C$ testing bottle 11 directly by the gas compressor 85. The supercritical carbon dioxide may be generated in the $^{14}C$ testing bottle 11 by controlling the temperature and pressure of it. However, controlling this process is relatively difficult, with high failure rate, so it is not the optimal choice.

Tenth Embodiment

Figure 13:
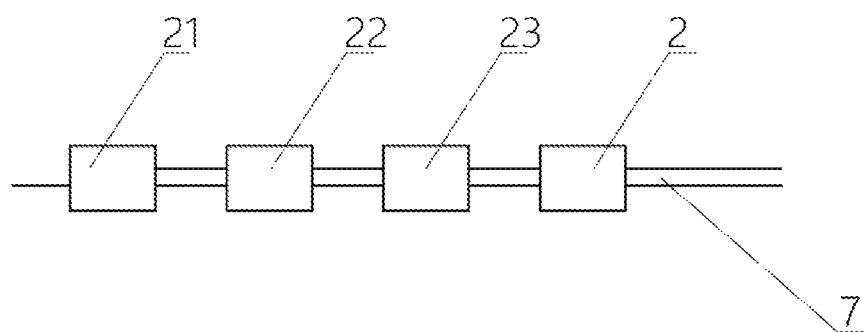
FIG. 13 is a schematic diagram of the filtering device according to the tenth embodiment.

The tenth embodiment provides a sampling and preparation system, which further improves the sampling and preparation system in any of the seventh to ninth embodiments. The main improvement is that, in the tenth embodiment, as shown in the FIG. 13, the filtering devices 2 comprise the following sequentially connected units: preposition dust filter 21, dryer 22, postposition dust filter 23.

The flue gas suctioned by the sampling pump 7 is filtered primarily by passing the preposition filter 21. After removing the most particulate matter in the flue gas, the moisture and particulate matter in the flue gas are removed completely by passing the dryer 22 and the postposition filter 23 sequentially, which may ensure the normal operation of the mass flow controller 3.

Specifically, the postposition filter 23 may use HEPA rose box to enhance the filtering effect.

The Eleventh Embodiment

Figure 14:
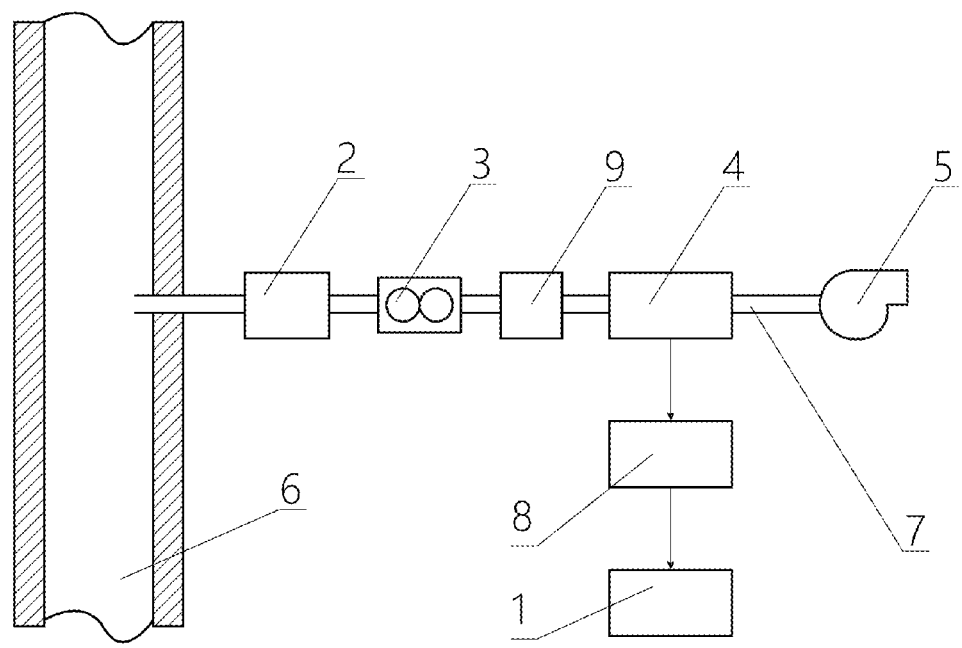
FIG. 14 is a structured flowchart of the sampling and preparation system according to the eleventh embodiment.

The eleventh embodiment provides a sampling and preparation system, which further improves the sampling and preparation system in the tenth embodiment. The main improvement is that, in the eleventh embodiment, as shown in the FIG. 14, there is a cold trap 9 positioned between the mass flow controller 3 and the carbon dioxide trap 4, and the temperature of the cold trap 9 ranges from minus 40 degrees Celsius to minus 60 degrees Celsius.

The positioned cold trap 9 may remove the impurity gases whose boiling point is higher than carbon dioxide, such as sulfur dioxide, nitrogen dioxide, sulfur anhydride and so on.

Compared to the prior art, this embodiment improves the purity of carbon dioxide by using cold trap 9 to purify and fix carbon dioxide, and improves the detection accuracy.

Those of ordinary skill in the art can understand that many technical details are proposed to provide readers with a better understanding of the present invention. However, even if there are no technical details and variations and modifications based on the above embodiments, the technical solutions for the claims of the present application can be substantially realized. Therefore, in practice, various modifications can be made in form and detail to the above embodiments without departing from the spirit and scope of the present invention.

The invention claimed is:

1. A $^{14}C$ testing bottle comprising:
a pressure-bearing shell;
a sample bin positioned in the pressure-bearing shell, wherein at least part of the sample bin is transparent;
a cavity arranged in the sample bin, wherein, the sample bin diffuses light produced in the cavity;
an injection port connected to the cavity; and
an optical fiber channel set on the pressure-bearing shell, wherein one end of the optical fiber channel is connectable with a scintillation counter and the other end of the optical fiber channel is connected with the transparent part of the sample bin.

2. The $^{14}C$ testing bottle according to claim 1, wherein:
the transparent part of the sample bin is coated with a diffuse reflection coating on its outer surface; or
the sample bin comprises a body and a transparent sheet embedded in the body; and the body has an inner wall which diffuses light generated in the body.

3. The $^{14}C$ testing bottle according to claim 1, wherein:
an insulation layer is arranged between the pressure-bearing shell and the sample bin;
a cover seals the injection port via threads;
the $^{14}C$ testing bottle further comprising an air hole, wherein the air hole passes through the pressure-bearing shell and the sample bin, and a screw or a rubber plug seals the air hole;
a sensor comprising a wire rod is arranged in the cavity, and the wire rod is connected to an external terminal through the air hole; and
the cavity is spherical or cylindrical.

4. A $^{14}C$ testing device comprising:
an optical fiber,
a scintillation counter and
a $^{14}C$ testing bottle comprising:
a pressure-bearing shell;
a sample bin positioned in the pressure-bearing shell, wherein at least part of the sample bin is transparent;
a cavity arranged in the sample bin, wherein, the sample bin diffuses light produced in the cavity;
an injection port connected to the cavity; and
an optical fiber channel set on the pressure-bearing shell, wherein one end of the optical fiber channel is connectable with the scintillation counter and the other end of the optical fiber channel is connected with the transparent part of the sample bin;
wherein, one end of the optical fiber is inserted into the optical fiber channel, and the other end of the optical fiber is connected to the scintillation counter.

5. A $^{14}C$ testing method comprising:
providing a $^{14}C$ testing device to perform the testing method, wherein the $^{14}C$ testing device comprises:
an optical fiber;
a scintillation counter;
a pressure-bearing shell;
a sample bin positioned in the pressure-bearing shell, wherein at least part of the sample bin is transparent;
a cavity arranged in the sample bin, wherein, the sample bin diffuses light produced in the cavity;
an injection port connected to the cavity; and
an optical fiber channel set on the pressure-bearing shell, wherein one end of the optical fiber channel is connected with the scintillation counter and the other end of the optical fiber channel is connected with the transparent part of the sample bin;
a mixing step comprising: mixing up liquid carbon dioxide or supercritical carbon dioxide and a scintillator in the $^{14}C$ testing bottle, then setting it in a dark condition for a preset standing time; and
a counting step comprising: inserting one end of the optical fiber into the optical fiber channel of the $^{14}C$ testing bottle, connecting the other end of the optical fiber to the scintillation counter, and then starting counting.

6. The $^{14}C$ testing method according to claim 5, further comprising the following step before the mixing step:
pretreatment step: pre-treating the carbon dioxide into liquid or supercritical state;
wherein, if the carbon dioxide is pretreated into liquid state, the mixing ratio of the liquid carbon dioxide and the scintillator is from 10:1 to 100:1(volume ratio) during the mixing step;
if the carbon dioxide is pretreated into supercritical state, the mixing ratio of supercritical carbon dioxide and scintillator is from 0.16 L/g to 0.4 L/g(volume mass ratio).

7. The $^{14}C$ testing method according to claim 5, wherein the standing time is 2 to 5 hours.

8. A sampling and preparation system used for calculating a blending ratio of a coal and biomass co-fired power station, comprising:
a sampling pipe connectable with a boiler flue of a co-fired power station, wherein the sampling pipe comprises the following elements sequentially arranged from an end close to the boiler flue to another end away from the boiler flue:
a filtering device, a mass flow controller, a carbon dioxide trap and a pumping device;
wherein the sampling and preparation system further comprises a carbon dioxide transferring device; and
a $^{14}C$ testing device comprising:
an optical fiber;
a scintillation counter;
a pressure-bearing shell;
a sample bin positioned in the pressure-bearing shell, wherein at least part of the sample bin is transparent;
a cavity arranged in the sample bin, wherein, the sample bin diffuses light produced in the cavity;
an injection port connected to the cavity; and
an optical fiber channel set on the pressure-bearing shell, wherein one end of the optical fiber channel is connected with the scintillation counter and the other end of the optical fiber channel is connected with the transparent part of the sample bin;

wherein the carbon dioxide transferring device is arranged to transfer carbon dioxide from the carbon dioxide trap into the $^{14}C$ testing device, and the $^{14}C$ testing device is arranged to measure $^{14}C$ in the carbon dioxide.

9. The sampling and preparation system according to claim 8, wherein the filtering device comprises the following sequentially connected units:

a preposition dust filter, a dryer and a postposition dust filter;

wherein a cold trap is arranged between the mass flow controller and the carbon dioxide trap, and wherein a temperature of the cold trap ranges from minus 40 degrees Celsius to minus 60 degrees Celsius.

* * * * *